United States Patent [19]
Janda et al.

[11] Patent Number: 5,731,018
[45] Date of Patent: Mar. 24, 1998

[54] METHOD FOR PRODUCTION OF A FRUIT OR VEGETABLE JUICE CONCENTRATE

[75] Inventors: Walter Janda, Rheinfelden, Switzerland; Kurt Dörreich, Grenzach-Wylen, Germany

[73] Assignee: Novo Nordisk A/S, Bagsvaerd, Denmark

[21] Appl. No.: 447,285

[22] Filed: May 22, 1995

(Under 37 CFR 1.47)

Related U.S. Application Data

[63] Continuation of Ser. No. 854,673, filed as PCT/DK90/00276, Oct. 31, 1990, abandoned.

[30] Foreign Application Priority Data

Nov. 1, 1989 [DK] Denmark ................... 5452/89

[51] Int. Cl.⁶ ........................................ A23L 2/02
[52] U.S. Cl. ................... 426/51; 426/49; 426/50; 426/52; 426/330.5; 426/590; 426/599; 426/478; 426/492; 426/520
[58] Field of Search .................... 426/49, 51, 599, 426/50, 52, 590, 615, 616, 330, 330.3, 330.5, 331, 333, 478, 486, 487, 488, 489, 492, 495, 520

[56] References Cited

U.S. PATENT DOCUMENTS

| | | | |
|---|---|---|---|
| 4,275,648 | 6/1981 | Mouri et al. | 99/483 |
| 4,620,980 | 11/1986 | Dumont | 426/330.5 |

FOREIGN PATENT DOCUMENTS

| | | |
|---|---|---|
| 2163062 | 2/1986 | United Kingdom. |
| WO 8802223 | 4/1988 | WIPO. |
| 8806005 | 8/1988 | WIPO. |
| WO 8806005 | 8/1988 | WIPO. |

OTHER PUBLICATIONS

Kaisha, abstract of JP 57 56 344 (1982).

Basaez et al., abs. of Investigacion Agricola, vol. 2, No. 1 (1976).

El-Mubarak et al., abs. of Sudan J. Food Sci. Tech., Vol. 7 (1975).

W. Janda, Flussiges Obst, No. 7, pp. 308–316 (1983).

*Primary Examiner*—Leslie Wong
*Attorney, Agent, or Firm*—Steve T. Zelson, Esq.

[57] ABSTRACT

Method for production of a fruit or vegetable juice concentrate, the steps including milling of the fruit or vegetables in a fruit or vegetable mill with addition of enzymes, heating of the formed mash, stirring of the heated mash with aeration, pressing of the heated aerated mash, centrifugation of the liquid phase from the press, recovery of aroma components by distillation of the supernatant from the centrifugation, and treatment of the dearomatized supernatant from the centrifugation for final degradation of starch and pectin in a holding tank, the treated dearomatized supernatant from the centrifugation is filtered on an ordinary filter, whereafter the filtrate is concentrated. In relation to this method an ordinary filter is used, which is much cheaper than the hitherto used ultrafiltration equipment.

2 Claims, No Drawings

METHOD FOR PRODUCTION OF A FRUIT OR VEGETABLE JUICE CONCENTRATE

This application is a continuation of application Ser. No. 07/854,673, filed May 1, 1992, now abandoned, which is a National Stage filing of PCT/DK90/00276 filed Oct. 31, 1990, the contents of which are incorporated herein by reference.

FIELD OF THE INVENTION

The method according to the invention for production of a clear and stable fruit or vegetable juice concentrate comprises milling of fruit or vegetables in a fruit or vegetable mill with addition of enzymes, heating of the formed mash, stirring of the heated mash, pressing of the heated mash, centrifugation of the liquid phase from the press, recovery of aroma components by distillation of the supernatant from the centrifugation, and treatment of the dearomatized supernatant from the centrifugation for final degradation of starch and pectin in a holding tank.

BACKGROUND OF THE INVENTION

A method of this kind and representing the most recent technology in regard to advanced fruit processing is described in a brochure published by Novo Nordisk Ferment (Switzerland) Ltd., Neumatt, CH-4243 Dittingen, "Advanced Fruit Processing AFP-Technology, Biotechnology for low costs in Apple Processing".

It appears from this brochure that the known process involves the use of an ultrafiltration plant. Thus, it has been considered a conditio sine qua non to perform the ultrafiltration in order to obtain a satisfactory concentrate, viz. in order to get rid of the soluble proteins and other turbidity generating substances in the concentrate. The ultrafiltration equipment is one of the most expensive pieces of equipment in the entire fruit processing plant, and it would be most desirable to be able to substitute this expensive piece of equipment with a cheaper piece of equipment.

In WO 88/06005 (For the sake of brevity in the following identified as the Bucher citation) a process is described for extraction of juices from fruits.

U.S. Pat. No. 4,275,648 describes a method for production of turbid fruit juices, typically orange juices. These juices are not clear juices as the juices produced by means of the method according to the invention. Production of clear fruit juices and turbid fruit juices are two quite distinct fields of technology. Also, the very important aeration step carried out according to the invention does not appear in this prior art process.

Thus, the purpose of the method according to the invention is the provision of a method which utilizes an equipment which is cheaper than the equipment which has hitherto been considered necessary in order to produce a satisfactory concentrate.

SUMMARY OF THE INVENTION

Now, surprisingly, according to the invention, it has been found that it is possible to substitute the expensive ultrafiltration equipment with an ordinary inexpensive filtration equipment without any loss of quality of the concentrate, if the heated mash is aerated. An ordinary inexpensive filtration equipment or an ordinary filter is a filter, the pores of which are not as small as the pores in an ultrafilter, but the pores of which are small enough to be able to generate a filtrate with no visual turbidity, or expressed otherwise a filter, which has normally been used after the traditional fining for polishing the juice.

The soluble proteins have to be removed from the juice in order to produce a stable concentrate and the skilled worker in the art has hitherto considered an ultrafiltration equipment or any other filtration equipment with molecular sieving effect a conditio sine qua non for removal of the soluble proteins from the juice.

DESCRIPTION OF THE PREFERRED EMBODIMENTS

Thus, the method according to the invention for production of a fruit or vegetable concentrate comprises milling of the fruit or vegetables in a fruit or vegetable mill with addition of enzymes, heating of the formed mash, stirring of the heated mash, pressing of the heated mash, centrifugation of the liquid phase from the press, recovery of aroma components by distillation of the supernatant from the centrifugation, and treatment of the dearomatized supernatant from the centrifugation is for final degradation of starch and pectin in a holding tank, and the method according to the invention is characterized by the fact that the heated mash is aerated, and that the treated dearomatized supernatant from the centrifugation is filtered on an ordinary filter, whereafter the filtrate is concentrated.

An ordinary filter, as above defined, is much cheaper than an ultrafiltration equipment and thus the method according to the invention fulfils the purpose of the invention.

The Bucher process comprises milling of fruits and enzyme treatment, and these steps are also included in the method according to the invention. However, the method according to the invention comprises the further steps of heating, stirring with aeration, pressing and centrifugation, dearomatization, starch and pectin decomposition of the dearomatized supernatant, and filtration of the treated supernatant by means of a usual filter. Thus, the method according to the invention is a much more specialized method than the Bucher process (which also comprises a filtration by means of an ordinary filter and a membrane filtration), and the prior art method which is most related to the method according to the invention and in relation to which the inventive step should be estimated, is the previously indicated brochure published by Novo Nordisk Ferment (Switzerland) Ltd.

U.S. Pat. No. 4,275,648 describes a method for production of turbid fruit juices, typically orange juices. These juices are not clear juices as the juices produced by means of the method according to the invention. Production of clear fruit juices and turbid fruit juices are two quite distinct fields of technology. Also, the very important aeration step carried out according to the invention does not appear in this prior art process.

The fruit or vegetable juice concentrate which is produced by means of the method according to the invention can be any fruit or vegetable juice which is supposed to be clear, e.g. a juice derived from apples, berries, grapes, pears, lemon, pineapple, tropical fruits, black or red currants, celery or onions.

The enzymes which are added to the fruit or vegetable mill are usually cell wall degrading enzymes, cellulases, hemicellulases, pectinases and/or proteinases.

The mash is usually heated to a temperature of around 10°–60° C., in regard to apples preferably around 25° C., to accelerate the enzymatic reaction.

The stirring of the heated mash is usually carried out for around 2 hours in order to ensure complete enzymatic reaction.

The treatment of the dearomatized supernatant from the centrifugation for final degradation of starch and pectin is usually carried out for around 30 minutes.

In this specification with claims the term "an ordinary filter" is to be understood as any industrially applicable filter without molecular sieving effect, for instance a batch or a continuous vacuum filter (e.g. a drum filter), or a batch or a continuous pressure filter (e.g. a plate and frame filter). For further examples of ordinary filters, reference can be made to Perry Chemical Engineers Handbook, fifth ed., page 19–57 to 19–87.

A preferred embodiment of the method according to the invention is characterized by the fact that the ordinary filter is a drum filter. This filter is inexpensive, and it can be operated continuously.

The fruit or vegetable juice concentrate produced according to the invention can be converted to a fruit or vegetable juice for human consumption by dilution with water and addition of aroma concentrate.

In order to illustrate the technical advantage of the method according to the invention, reference can be made to the fact that a typical drum filter as an average costs around only 60% of a corresponding ultrafiltration unit with the same capacity.

Also, reference is made to the following examples which illustrate the method according to the invention in comparison to the prior art methods.

EXAMPLE 1

220 kg of industrial juice apples (blend of different kinds of apples) were stored for 48 hours in a room with a room temperature of 23° C. Thereafter, the apples were milled in a Bucher® Central 2 mill (6 mm knives). From the resulting mash, exactly 200 kg were taken out and brought into a tank which is equipped with a MIG-stirrer and an aeration device. 140 g of AFP-enzyme (available from Novo Nordisk Ferment (Switzerland) Ltd., CH-4243 Dittingen) with a pectinolytic activity of 10,500 PEG units/g was added to the mash. The mash was kept in the tank for 2 hours under stirring and aeration (approximately 200 l of normal air per minute). Thereafter, the mash was pressed in a Bucher® HP press for 1 hour. 182 l of juice were obtained, containing around 15% of insoluble solids. To the resulting juice, 30 ml of a depectinisation enzyme (Pectinex® 3XL, 14,650 PEG units/g) was added for complete depectinisation which was achieved after around 30 minutes. The definition of the PEG pectolytic unit appears from the brochure "Viscosimetric Polygalacturonase Determination", available from Novo Nordisk Ferment (Switzerland) Ltd., CH-4243 Dittingen.

The juice volume was split into two batches, each batch having a volume of 91 l. One batch was ultrafiltered by means of an ABCOR® ultrafiltration membrane (tubular membrane, 1 inch in diameter, cut off value 18,000 Daltons). A 2 l sample of the permeate was concentrated to 72 Brix in a lab rotary vacuum concentrator. The resulting concentrate had a light extinction of 0.092 at 720 nm.

The other batch was filtered by means of a kieselguhr filter. Again, a 2 l sample of the filtrate was concentrated like the first batch. The resulting concentrate had a light transmission of 0.096 at 720 nm. Both concentrates were stored at room temperature for 3 months without any significant change in light extinction.

EXAMPLE 2

20 tons of industrial juice apples (blend of different kinds of apples) were milled by means of a Bucher® Central mill (6 mm knives) to which 14 l of AFP-enzyme of the same kind as used in example 1 was dosed continuously by means of a dosage pump. The resulting mash was heated to 25° C. by means of a water heated tubular mash heater and pumped into an enzyme reaction tank, equipped with a stirrer and an aeration device. The mash was kept there for 2 hours under stirring and aeration (800 l of air with normal temperature and pressure per ton of mash and minute). Thereafter, the mash was pressed in a Bucher® HP 5000 press. The resulting juice was sieved over a shaking screen and centrifuged by means of a Westfalia SA 100 centrifuge. The centrifuged juice was passed through an aroma recovery plant (outlet temperature 50° C.). The dearomatized juice was treated with 30 g of a depectinisation enzyme (Pectinex® 3XL) for complete pectin degradation which was achieved after around 40 minutes. The completely depectinized juice was ultrafiltered by means of an ABCOR® ultrafiltration unit (tubular membranes, diameter 0.5 inch, cut off value 18,000 Daltons). The permeate was concentrated to 72° Brix. The thus produced concentrate had a light extinction of 0.068 at 720 nm.

A second batch of 20 tons of apples was treated in the very same way as the first batch. However, the completely depectinized juice in this case was not passed through an ultrafiltration unit but was filtered by means of a vacuum rotary filter. The resulting filtrate was concentrated to a 72° Brix concentrate. This concentrate had a light extinction of 0.064 at 720 nm.

Samples of both concentrates were stored at room temperature for 3 months without significant changes in light extinction.

The foregoing examples clearly demonstrate that the invention fulfils the claimed purpose.

We claim:

1. Method for production of a clear and stable fruit or vegetable juice concentrate comprising:
   milling of fruit or vegetables in a fruit or vegetable mill with addition of enzymes to form a mash,
   heating of the formed mash,
   stirring of the heated mash,
   pressing of the heated mash,
   centrifugation of the liquid phase from the press,
   recovery of aroma components by distillation of the supernatant from the centrifugation, and
   enzymatic treatment of the dearomatized supernatant from the centrifugation for final degradation of starch and pectin in a holding tank, wherein the heated mash is aerated, and the enzymatically treated dearomatized supernatant from the centrifugation is filtered on industrially applicable filter without molecular sieving effect, whereafter the filtrate is concentrated.

2. Method according to claim 1, wherein the filter is a drum filter.

* * * * *